(12) United States Patent
Lung et al.

(10) Patent No.: US 12,205,788 B1
(45) Date of Patent: Jan. 21, 2025

(54) BREAKER RETENTION BRACKET

(71) Applicant: Lunar Energy, Inc., Mountain View, CA (US)

(72) Inventors: Jonathan Lung, San Jose, CA (US); Aaron Neely, San Jose, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/638,455

(22) Filed: Apr. 17, 2024

(51) Int. Cl.
*H01H 9/02* (2006.01)

(52) U.S. Cl.
CPC .................................. *H01H 9/02* (2013.01)

(58) Field of Classification Search
CPC ............... H02B 1/0565; H02B 1/041; H01H 2071/0242; H01H 1/0271; H01H 9/02; H01H 9/22
See application file for complete search history.

(56) References Cited

U.S. PATENT DOCUMENTS

| | | | | |
|---|---|---|---|---|
| 4,435,739 A * | 3/1984 | Shelvik | ................. | H02B 1/056 361/627 |
| 4,724,513 A * | 2/1988 | M'Sadoques | ............ | H02B 1/04 361/652 |
| 5,744,768 A * | 4/1998 | Bishop | ............... | H01H 71/0214 200/50.01 |
| 5,880,927 A * | 3/1999 | Kent | ...................... | H02B 1/052 200/334 |
| 5,978,209 A * | 11/1999 | Montague | .............. | H02B 1/056 200/50.01 |
| 7,286,340 B2 * | 10/2007 | Karim | .................... | H02B 1/042 200/50.01 |
| 7,372,706 B2 * | 5/2008 | Bell | ....................... | H04Q 1/116 174/32 |
| 8,759,697 B2 * | 6/2014 | Polston | .............. | H01H 71/0257 200/293 |
| 2015/0311007 A1 * | 10/2015 | Albertson | .............. | H02B 1/048 200/296 |
| 2024/0006140 A1 * | 1/2024 | Fasano | .................. | H01H 71/08 |

* cited by examiner

*Primary Examiner* — Bradley Duckworth
(74) *Attorney, Agent, or Firm* — Van Pelt, Yi & James LLP

(57) ABSTRACT

A breaker retention bracket is disclosed, including: a retention portion comprising one or more retention fingers that are positioned to overlap at least a portion of a breaker installed in a load tray; a footer portion that couples the breaker retention bracket to the load tray; and a flexible truss-structure with a top surface, wherein compression of the flexible truss-structure causes flexing of the top surface to facilitate coupling or uncoupling of the breaker retention bracket to the load tray.

19 Claims, 10 Drawing Sheets

BREAKER RETENTION BRACKET

BACKGROUND OF THE INVENTION

A conventional circuit breaker usually receives power from a bus bar in a circuit breaker panel load tray. As a result, current flows from a power source into the bus bar and then through the conventional breaker and out to a load via a wire. However, a "back-fed" or "reverse-fed" circuit breaker differs in that it receives current from a device which can be a power source via a wire and then passes the current to the bus bar of the load tray, thereby providing the conventional breakers in the load tray with power. Standards for circuit breaker panels require such back-fed breakers to be retained such that they cannot simply be pulled away from the load tray after the circuit breaker panel's protective cover has been removed. If a back-fed breaker were to come loose from the load tray, it would remain energized and potentially cause injuries. It would be desirable for a breaker retention bracket mechanism to be convenient to use and widely compatible with different breaker manufacturers and applications.

BRIEF DESCRIPTION OF THE DRAWINGS

Various embodiments of the invention are disclosed in the following detailed description and the accompanying drawings.

DETAILED DESCRIPTION

Figure 1:
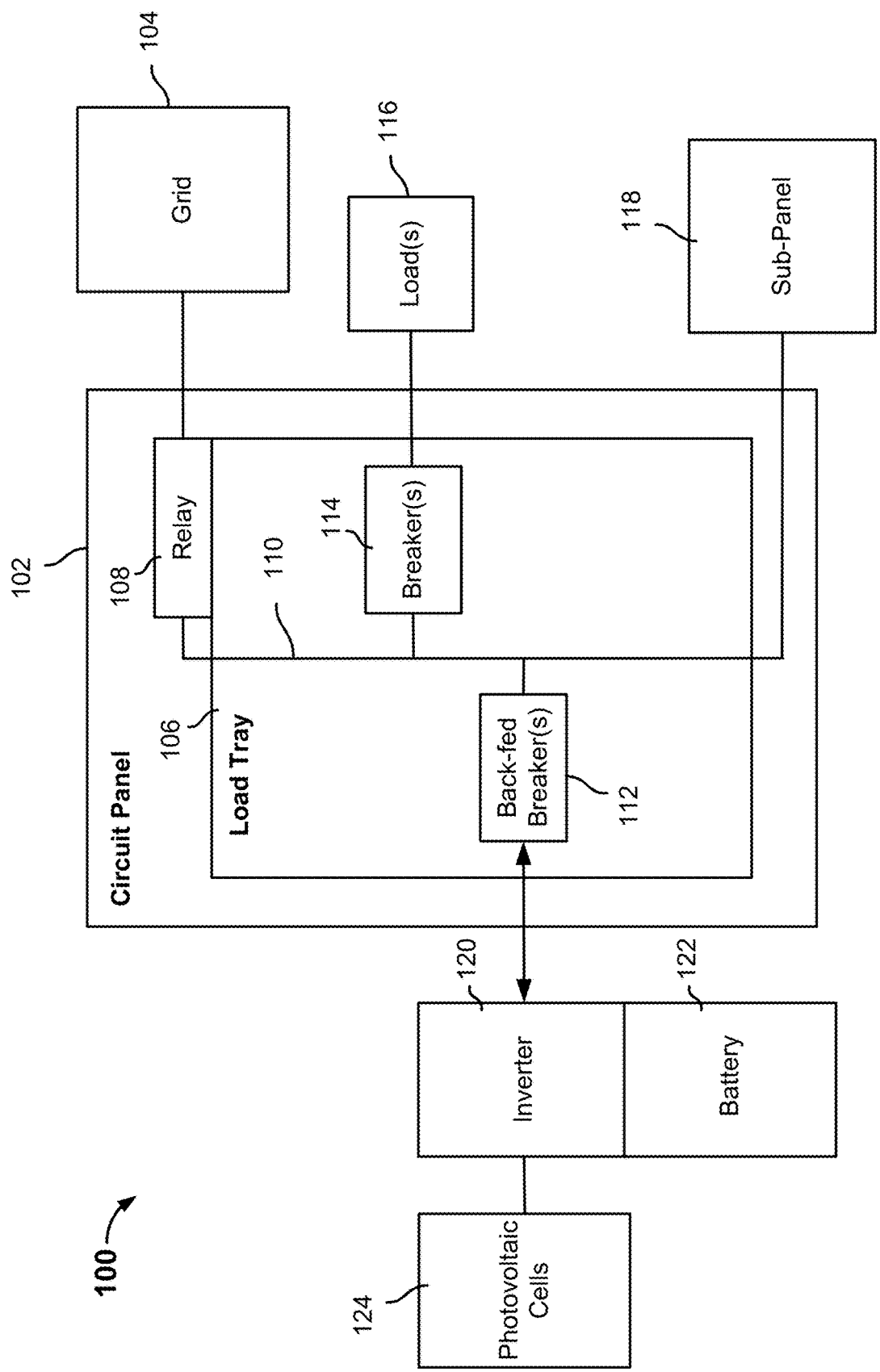
FIG. 1 is a diagram showing a system for managing electric power sources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a breaker retention bracket are described herein. The breaker retention bracket comprises a retention portion including one or more retention fingers that are positioned to overlap at least a portion of a breaker installed in a load tray. In various embodiments, the breaker(s) that are held down by the breaker retention bracket are "back-fed" or "reverse-fed" breakers that can receive current from an external source (e.g., photovoltaic panels or a battery). The breaker retention bracket also includes a footer portion that couples the breaker retention bracket to the load tray. The breaker retention bracket further includes a flexible truss-structure with a top surface. The truss-structure can be compressed to cause flexing of the top surface to facilitate coupling or uncoupling of the breaker retention bracket to the load tray. As will be described in further detail below, the breaker retention bracket as described herein provides an easy-to-install and widely compatible mechanism for securing a breaker to a load tray (or load center or circuit breaker panel).

FIG. 1 is a diagram showing a system for managing electric power sources. As shown in FIG. 1, system 100 includes circuit panel 102, which includes load tray 106. Load tray 106 includes bus bar 110 that is in turn connected to relay 108, breaker(s) 114, back-fed breaker(s) 112, and sub-panel 118. Circuit panel 102 is connected to two alternative power sources: grid 104 and inverter 120. Grid 104 comprises a power grid provided by, for example, a utility company. In one example use case, grid 104 is the primary source of power and delivers current via wiring to load tray 106. Circuit panel 102 monitors grid 104 for potential issues in the current delivery, such as in the case of a brown out or a black out. When no such issues are detected by circuit panel 102, relay 108 remains closed and the current can pass through relay 108 into bus bar 110 of load tray 106. The current from grid 104 can then flow through bus bar 110 into regular breakers, breaker(s) 114 to power load(s) 116. For example, load(s) 116 include household appliances and other devices that draw power. The current from grid 104 can also flow through bus bar 110 to one or more other panels such as sub-panel 118, which may include its own breakers and associated loads (not shown in FIG. 1). When the power that passes through any breaker of breaker(s) 114 exceeds or meets a fault condition (e.g., the current exceeds a threshold amount), the triggered breaker will shut off the flow of current to load(s) 116.

When circuit panel 102 detects an issue with the power supplied by grid 104, circuit panel 102 will open relay 108 to disconnect from grid 104 and will instead allow current to flow from, for example, a secondary power source via a wire into back-fed breaker(s) 112 of load tray 106. One reason to disconnect load tray 106 from grid 104 in the event of an issue is that maintenance personnel may be working on grid 104 and the flow of current from load tray 106 to grid 104 could cause injury to the workers. In the example of system 100, the secondary power source that is coupled to back-fed breaker(s) 112 comprises battery 122 that stores energy produced by photovoltaic cells 124 (e.g., photovoltaic cells 124 are part of solar panels that are installed in an outside location that receives sunlight). Specifically, photovoltaic cells 124 generate energy in the form of direct current (DC) which may then be stored onto battery 122 for later use. When current is needed to be drawn into load tray 106 from the secondary power source (e.g., in response to an issue detected by circuit panel 102 from the primary power source such as grid 104), either the DC that is produced by photovoltaic cells 124 or the DC that is stored onto battery 122 is first converted into alternating current (AC) and then that current flows through back-fed breaker(s) 112 and into bus bar 110 to ultimately pass through breaker(s) 114 to power load(s) 116 and/or sub-panel 118.

Where circuit panel 102 causes current to be drawn from the secondary power source (comprising one or more of photovoltaic cells 124, battery 122, and inverter 120), that current passes via wiring into back-fed breaker(s) 112 and then to bus bar 110. In contrast, current passes through bus bar 110 and into regular breaker(s) 114. As a result, additional risk to an installer is associated with back-fed breaker(s) 112 because if a back-fed breaker were to come loose from load tray 106 (e.g., no longer plugged into a stab of load tray 106), it would remain "live" or energized, which would create a dangerous situation for an installer working on load tray 106. As such, back-fed breaker(s) 112 need to be physically held down on load tray 106 to ensure safety and meet product standards (e.g., National Electric Code (NEC) 408.36). Embodiments of a breaker retention bracket that can be used to secure breakers such as back-fed breaker(s) 112 down onto a load tray (e.g., load tray 106) or any circuit breaker panel are described herein.

Figure 2A:
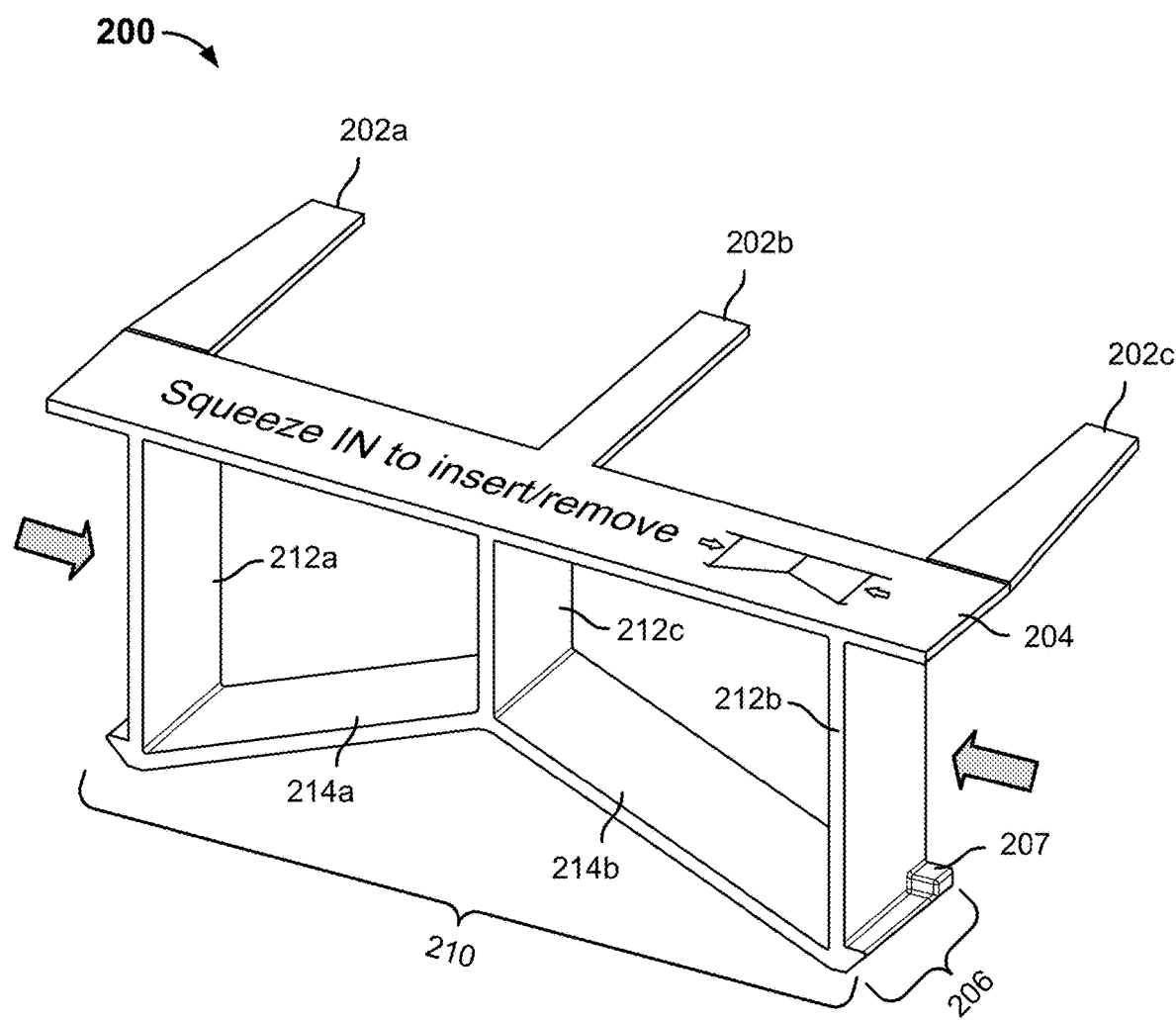
FIG. 2A is a diagram showing an embodiment of a breaker retention bracket in accordance with some embodiments.

FIG. 2A is a diagram showing an embodiment of a breaker retention bracket in accordance with some embodiments. FIG. 2A shows a view from the top of breaker retention bracket 200. Breaker retention bracket 200 is to be installed over one or two (e.g., back-fed) breakers that have already been installed into a load tray, as will be shown in examples described further below. As shown in FIG. 2A, breaker retention bracket 200 includes flexible truss-structure 210 with top surface 204, which includes three retention fingers 202a, 202b, and 202c. Flexible truss-structure 210 further includes three legs 212a, 212b, and 212c; two connectors 214a and 214b; and two footers including footer 206 and another footer at one end of leg 212a and that is partially occluded in FIG. 2A by leg 212a. Among three legs 212a, 212b, and 212c, the outer legs 212a and 212b are equal in length and each longer than leg 212c. Connector 214a connects legs 212a and 212c, and connector 214b connects legs 212c and 212b.

To install breaker retention bracket 200 over one or more breakers (not shown) that are already installed in a load tray, an installer user is to squeeze (e.g., using his or her hands) legs 212a and 212b towards leg 212c, to thereby cause connectors 214a and 214b to flex upwards and therefore allow the footers including footer 206 to also flex towards leg 212c. When legs 212a and 212b are squeezed, the footers (including footer 206) can be aligned with two respective breaker mounting features (e.g., hooks or teeth) on two sides of the load tray (not shown) and then legs 212a and 212b are released such that the footers slide under the respective breaker mounting features (e.g., hooks or teeth) of the load tray become locked in. The stoppers on the footers (such as stopper 207) engage with (e.g., push against) the sides of the breaker mounting features (e.g., hooks or teeth) of the load tray to keep breaker retention bracket 200 in place relative to the breaker mounting features (e.g., hooks or teeth). Similarly, when legs 212a and 212b are squeezed, at least some of the ends of retention fingers 202a, 202b, and 202c that are not attached to top surface 204 lift upwards, which facilitates the sliding of retention fingers 202a, 202b, and 202c over the top surfaces of the breaker(s) that are to be retained by breaker retention bracket 200. For example, pair of retention fingers 202a and 202b can cover and therefore help hold down up to two single-pole breakers or one double-pole breaker and pair of retention fingers 202b and 202c can also cover and therefore help hold down up to two single-pole breakers or one double-pole breaker. Top surface 204 also covers up terminal screws (not shown) that fasten wires into the breakers, which advantageously prevents the wires from disturbance while breaker retention bracket 200 is covering the breaker(s).

To remove or uninstall bracket 200 over one or more breakers that are already installed in a load tray, an installer is also to squeeze legs 212a and 212b towards leg 212c, which causes leg 212c to translate vertically into top surface 204, thereby causing top surface 204 to flex and therefore allow the footers, namely footer 206 to also translate towards leg 212c. This same compression action allows the footers to slide out from under the breaker mounting features (e.g., hooks or teeth) of the load tray and also lifts one or more of the unattached ends of retention fingers 202a, 202b, and 202c away from the top surfaces of the breaker(s). The compressed breaker retention bracket 200 can then be pulled away by the installer from the load tray to no longer hold down the breakers.

Due to the need to be compressible, breaker retention bracket 200 is made from flexible materials such as, plastic resin, a partially fiber-filled plastic, metal, or a composite material. One or more of retention fingers 202a and 202c can also be removed (e.g., manually broken off) if breaker(s) are only needed to be held down by one pair of such fingers. For example, as shown in FIG. 2A, each of retention fingers 202a and 202c include a breakaway line or score line along its connection to top surface 204 to facilitate the manual removal of the retention finger. Also, advantageously, because breaker retention bracket 200 can be both installed and uninstalled through squeezing legs 212a and 212b of flexible truss-structure 210, the use of breaker retention bracket 200 is completely toolless. Furthermore, breaker retention bracket 200 comprises an one-piece mechanism and does not require two or more complementary parts, as conventional hold down kits do.

In one example, the following components of breaker retention bracket 200 have the following approximate dimensions: The distance between the closest edges between retention fingers 202a and 202b and between retention fingers 202b and 202c is 61 millimeters (mm). The length of each of retention fingers 202a, 202b, and 202c from top surface 204 is 50 mm. The width of top surface 204 is 25 mm. The length of top surface 204 is 160 mm. The distance between legs 212a and 212b is 130 mm. The length of each of legs 212a and 212b is 62.5 mm. The length of footer 206 is 25 mm and the width of footer 206 is 4.7 mm.

Figure 2B:
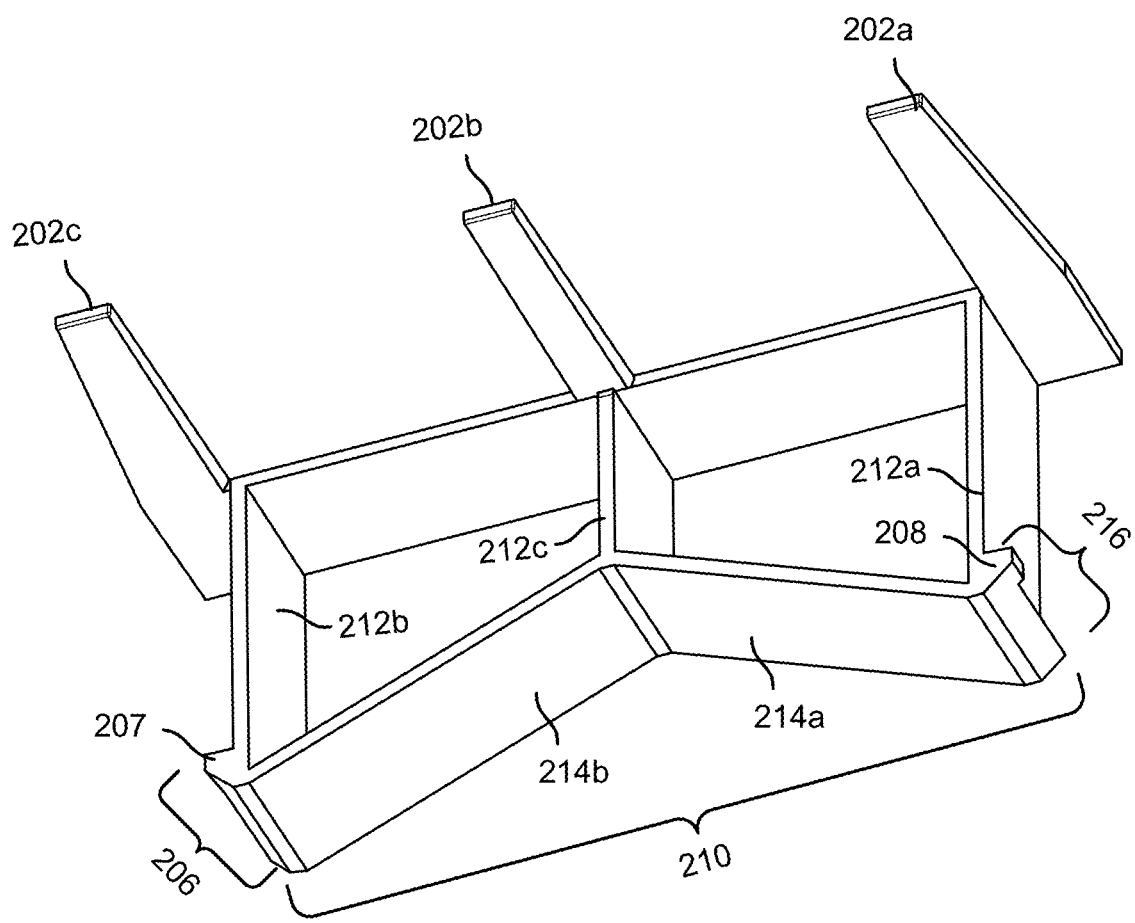
FIG. 2B shows a view from the bottom of a breaker retention bracket in accordance with some embodiments.

FIG. 2B shows a view from the bottom of a breaker retention bracket in accordance with some embodiments. Whereas FIG. 2A shows a view of breaker retention bracket 200 from the top, FIG. 2B shows a view of breaker retention bracket 200 from the bottom. Footer 216 at the bottom of leg 212a was partially occluded in FIG. 2A but is now more visible in FIG. 2B. Furthermore, stopper 208 portion of footer 216 was occluded in FIG. 2A but is now visible in FIG. 2B.

Figure 3:
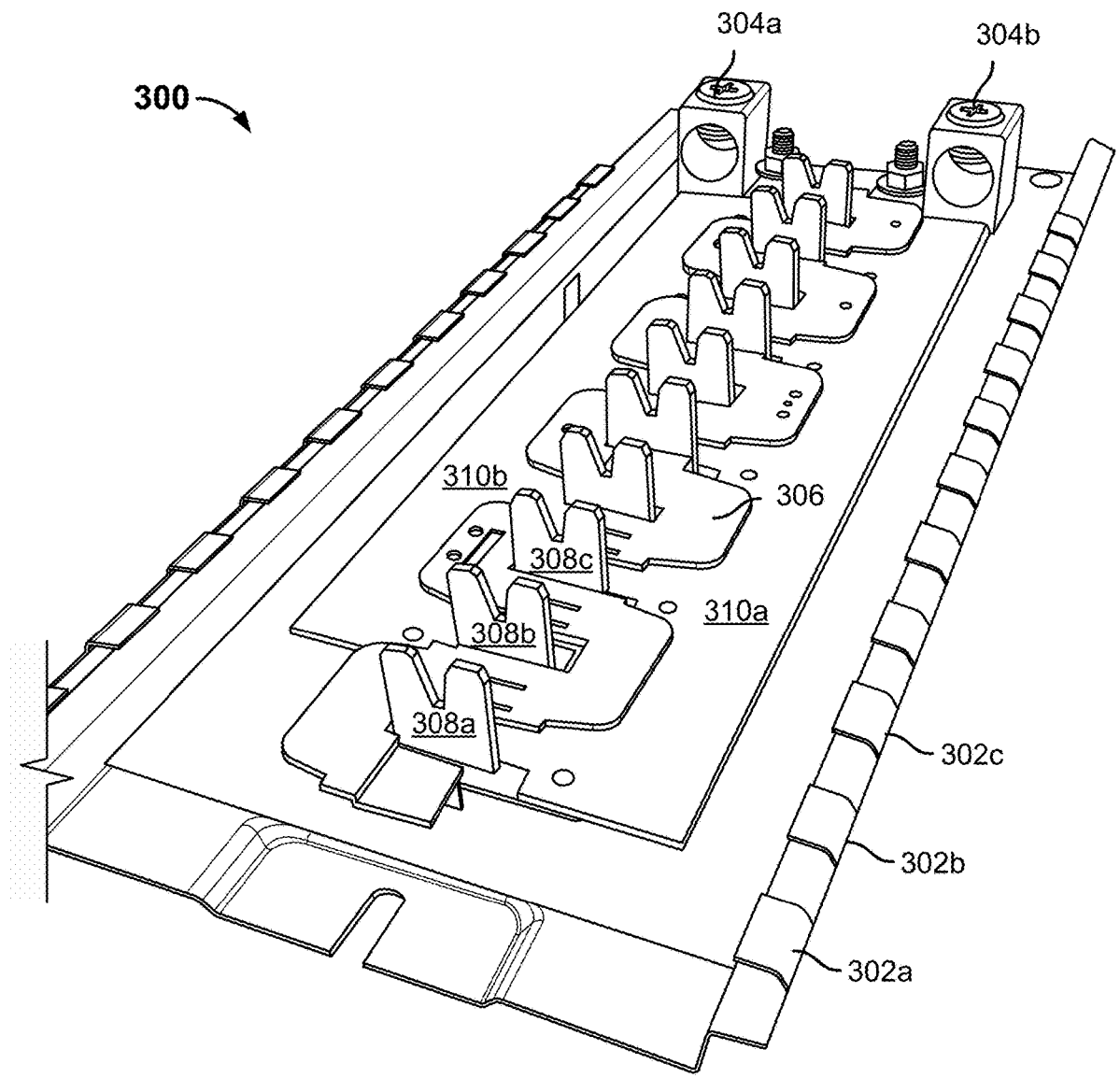
FIG. 3 is a diagram showing an example of an empty load tray in accordance with some embodiments.

FIG. 3 is a diagram showing an example of an empty load tray in accordance with some embodiments. In FIG. 3, load tray 300 includes bus bars 310a and 310b that are held in place by bus bar cover 306 (which ensures electrical isolation between bus bars 310a and 310b to prevent electrical arcing between the two conductors), which snakes around 10 stabs, including stabs 308a, 308b, and 308c, that are connected by bus bars 310a and 310b. In some embodiments, bus bar 110 of FIG. 1 can be implemented using bus bars 310a and 310b. Bus bars 310a and 310b carry current from terminal lugs 304a and 304b to each breaker (not shown) that is to be plugged into one of the stabs. Load tray 300 further includes hooks, such as hooks 302a, 302b, and 302c, that point towards the center of load tray 300 along each of its length-wise sides. As will be described in further detail below, to install a breaker into load tray 300, a portion of a breaker can be first secured under one or more hooks of load tray 300 before the breaker is pivoted to plug into a corresponding stab. According to certain electrical standards (e.g., NEC 705.12), a back-fed type of breaker needs to be installed at the end of the bus bar that is furthest away from the location at which power is to enter the load tray. In FIG. 3, power is to enter load tray 300 at terminal lugs 304a and 304b (for phase A and phase B power). Put another way, if a back-fed breaker were to be installed on load tray 300, the back-fed breaker would need to be coupled to stabs 308a and/or 308b. As will also be described in further detail below, to install a breaker retention bracket into load tray 300, a footer of the breaker retention bracket is engaged with (e.g., secured under) one or more hooks of load tray 300 and the retention fingers of the breaker retention bracket are placed over one or more breakers that have already been installed onto load tray 300.

Figure 4A:
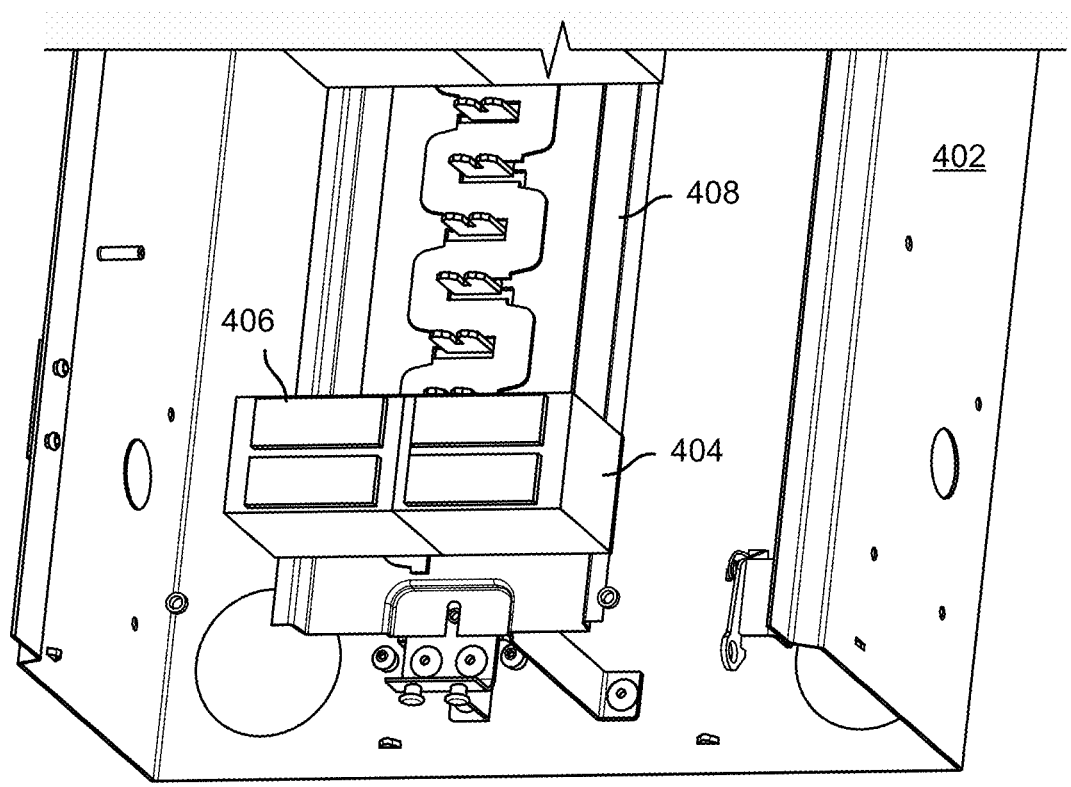
FIG. 4A is a diagram showing a breaker having been installed into a load tray in accordance with some embodiments.

FIG. 4A is a diagram showing a breaker having been installed into a load tray in accordance with some embodiments. In FIG. 4A, load tray 408 has been fastened to enclosure 402. In some embodiments, load tray 408 can be implemented using load tray 300 of FIG. 3. Two double-pole breakers 404 and 406 have been coupled, side by side, to two stabs of load tray 408. In some embodiments, back-fed breaker(s) 112 of FIG. 1 can be implemented using breakers 404 and 406. In the example of FIG. 4A, breakers 404 and 406 are two back-fed breakers and were therefore installed at the end of load tray 408 that is farthest from the point at which power (e.g., from a primary power source such as a grid) enters into load tray 408, in accordance with safety standards. Also in accordance with safety standards, the two back-fed breakers of double-pole breakers 404 and 406 are to be retained against load tray 408.

Figure 4B:
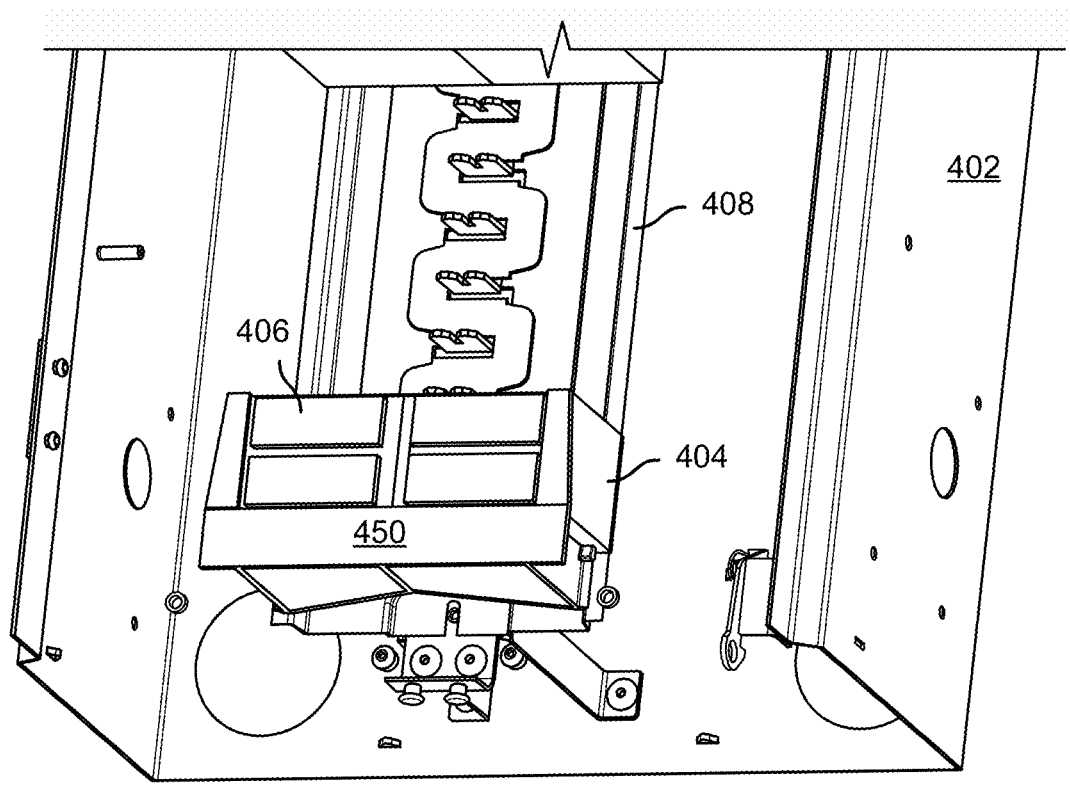
FIG. 4B is a diagram showing a breaker retention bracket over two breakers that have been installed into a load tray in accordance with some embodiments.

FIG. 4B is a diagram showing a breaker retention bracket over two breakers that have been installed into a load tray in accordance with some embodiments. In particular, FIG. 4B shows breaker retention bracket 450 that has been installed over back-fed breakers 404 and 406, which had been plugged into the stabs of load tray 408. In some embodiments, breaker retention bracket 450 can be implemented with breaker retention bracket 200 of FIG. 2A. Breaker retention bracket 450 can be installed over breakers 404 and 406 to secure breakers 404 and 406 in place to prevent them from being inadvertently dislocated from load tray 408, especially while the breakers are energized (e.g., with current from a secondary power source such as a battery or photovoltaic cells).

Figure 5A:
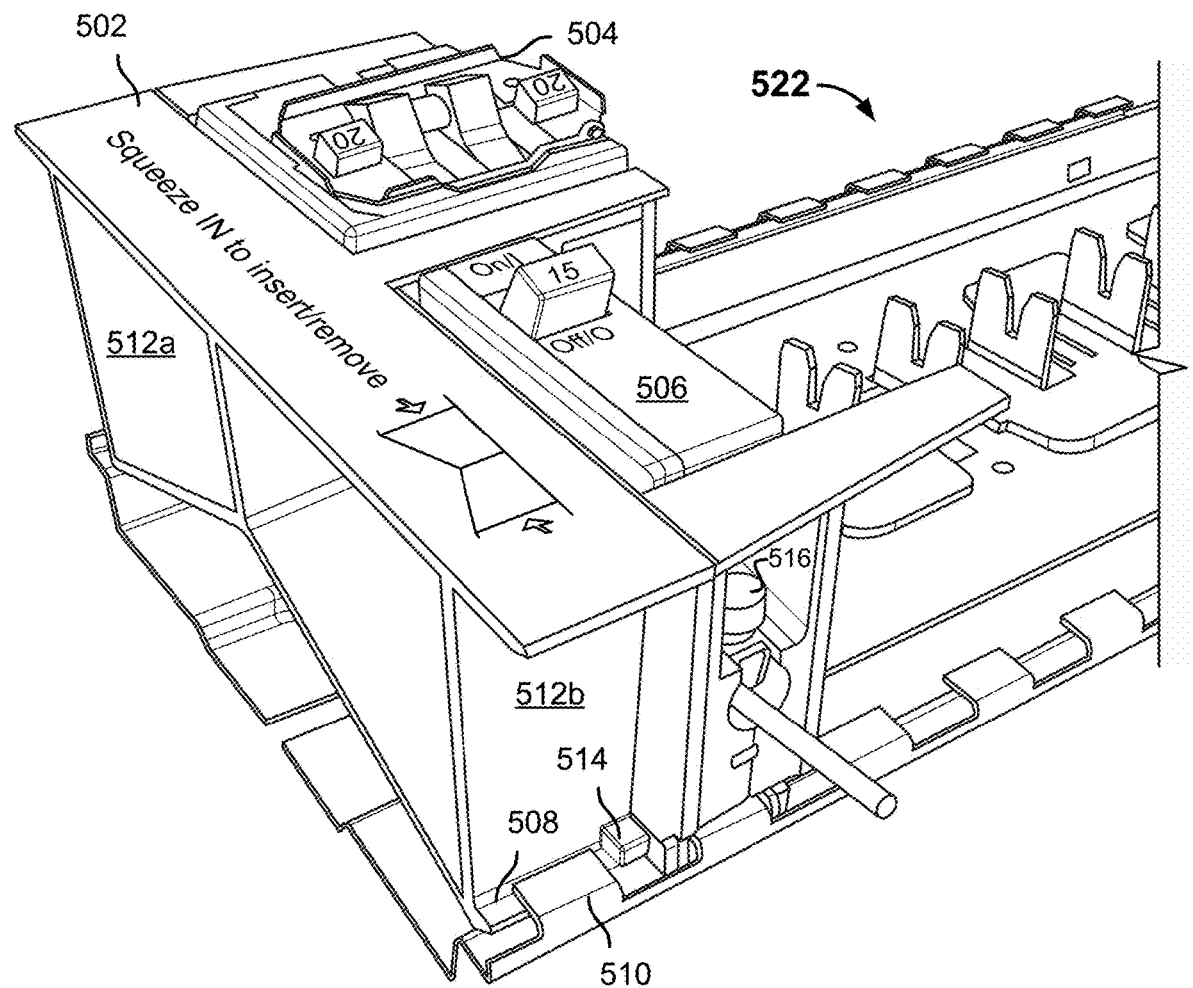
FIG. 5A is a diagram showing a first close-up, side view of a breaker retention bracket that has been secured over two installed adjacent breakers in accordance with some embodiments.

FIG. 5A is a diagram showing a first close-up, side view of a breaker retention bracket that has been secured over two installed adjacent (e.g., side-by-side) breakers in accordance with some embodiments. In the example of FIG. 5A, (e.g., back-fed) double-pole breaker 504 has been plugged into two stabs of load tray 522 and to its right, (e.g., back-fed) single-pole breaker 506 has been plugged into one stab of load tray 522. In some embodiments, back-fed breaker(s) 112 of FIG. 1 can be implemented using breakers 504 and 506. After breakers 504 and 506 had been installed into load tray 522, breaker retention bracket 502 was placed over breakers 504 and 506 and also installed into load tray 522 to hold down breakers 504 and 506 against load tray 522. In particular, to install breaker retention bracket 502, an installer user had squeezed on the external surfaces of legs 512a and 512b of breaker retention bracket 502 to reduce the distance between footer portions (including footer 508 below leg 512a and a corresponding, occluded footer portion below 524) of breaker retention bracket 502 and then released the legs so that the footer portions could extend below hooks (including hook 510) on the sides of load tray 522. Stoppers on the footers (including stopper 514 of footer 508) prevent breaker retention bracket 502 from sliding out of the end of load tray 522. As shown in FIG. 5A, the three retention fingers of installed breaker retention bracket 502 also sit on top of the top surfaces of breakers 504 and 506, thereby covering (from the top) terminals (including terminal 516 of breaker 506) of wires that are coupled to the breakers. As shown in FIG. 5A, the length of the retention fingers of breaker retention bracket 502 extends to about the standard width of a double-pole breaker and extends beyond the standard width of a single-pole breaker.

Figure 5B:
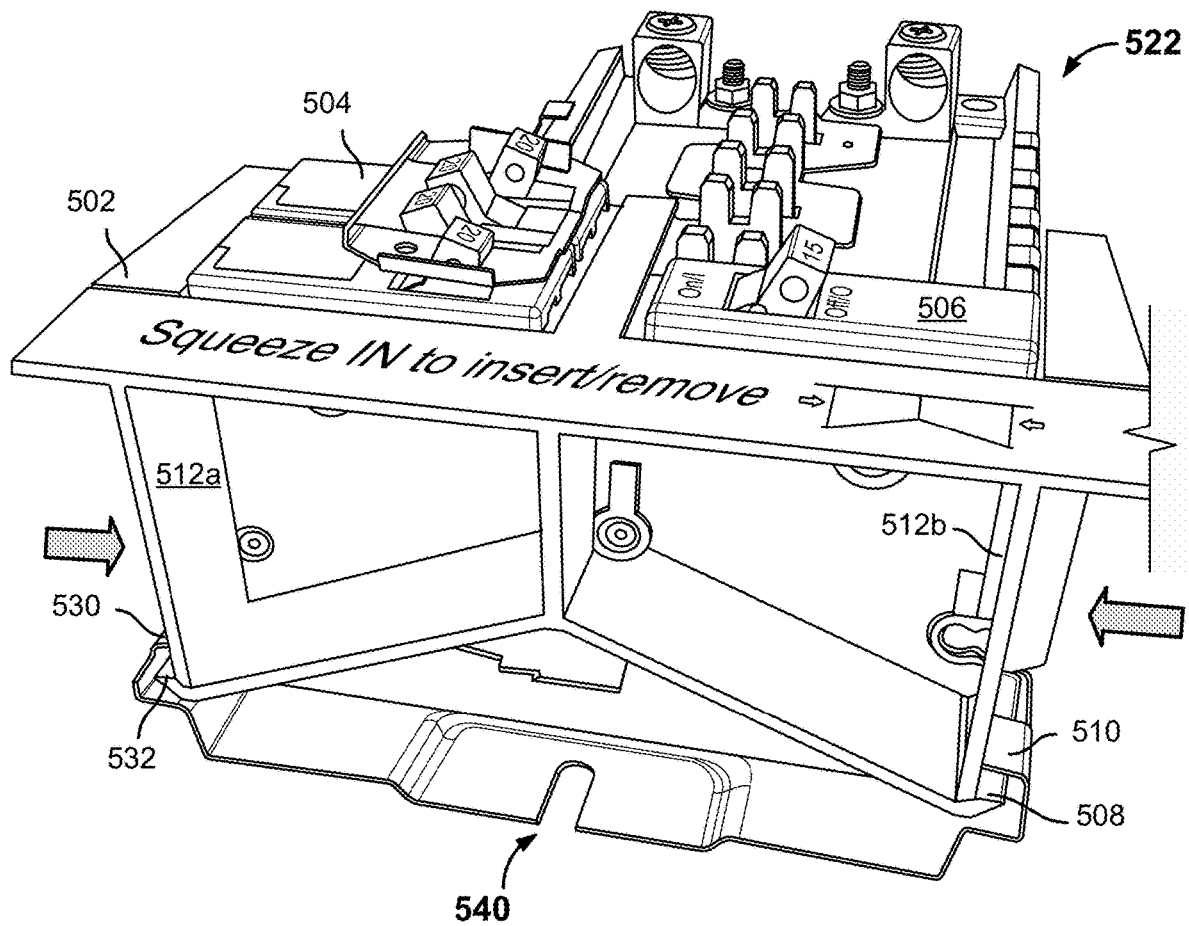
FIG. 5B is a diagram showing a second close-up, side view of a breaker retention bracket that has been secured over two installed adjacent breakers in accordance with some embodiments.

FIG. 5B is a diagram showing a second close-up, side view of a breaker retention bracket that has been secured over two installed adjacent (e.g., side-by-side) breakers in accordance with some embodiments. FIG. 5B shows another view of breaker retention bracket 502 that had been shown in FIG. 5A. As highlighted in FIG. 5B, breaker retention bracket 502 can be easily installed through an installer user squeezing the external surfaces of legs 512a and 512b of breaker retention bracket 502 together, sliding breaker retention bracket 502 in via the open end 540 of load tray 522, and then aligning footers 508 and 532 of breaker retention bracket 502 with respective hooks 510 and 530 of load tray 522. Once footers 508 and 532 of breaker retention bracket 502 are aligned with respective hooks 510 and 530, the user releases the external surfaces of legs 512a and 512b of breaker retention bracket 502 such that footers 508 and 532 of breaker retention bracket 502 rest under respective hooks 510 and 530 and the three retention fingers of breaker retention bracket 502 fit over the top surfaces of breakers 504 and 506. Breaker retention bracket 502 is secured into load tray 522 by virtue of footers 508 and 532 of breaker retention bracket 502 pushing/locking against respective hooks 510 and 530. While breaker retention bracket 502 is shown to slide under into the load tray from an open end of the load tray, in other examples, breaker retention bracket 502 can be inserted into any non-open portion of the load tray so long as footers 508 and 532 can be secured against hooks on opposite sides of the load tray. Legs 512a and 512b and the retention fingers of breaker retention bracket 502 also help leverage breakers 504 and 506 against each other to further prevent either of breakers 504 and 506 from becoming inadvertently decoupled from the stab(s) of load tray 522.

In FIG. 5B, to remove/uninstall breaker retention bracket 502 from load tray 522, an installer user would squeeze the external surfaces of legs 512a and 512b of breaker retention bracket 502 together to unlock footers 508 and 532 from respective hooks 510 and 530 and then slide breaker retention bracket 502 out from the open end 540 of load tray 522. Squeezing the external surfaces of legs 512a and 512b of breaker retention bracket 502 together also lifts the three retention fingers of breaker retention bracket 502 away from the top surfaces of breakers 504 and 506, therefore facilitating the removal of breaker retention bracket 502 from load tray 522.

Figure 6:
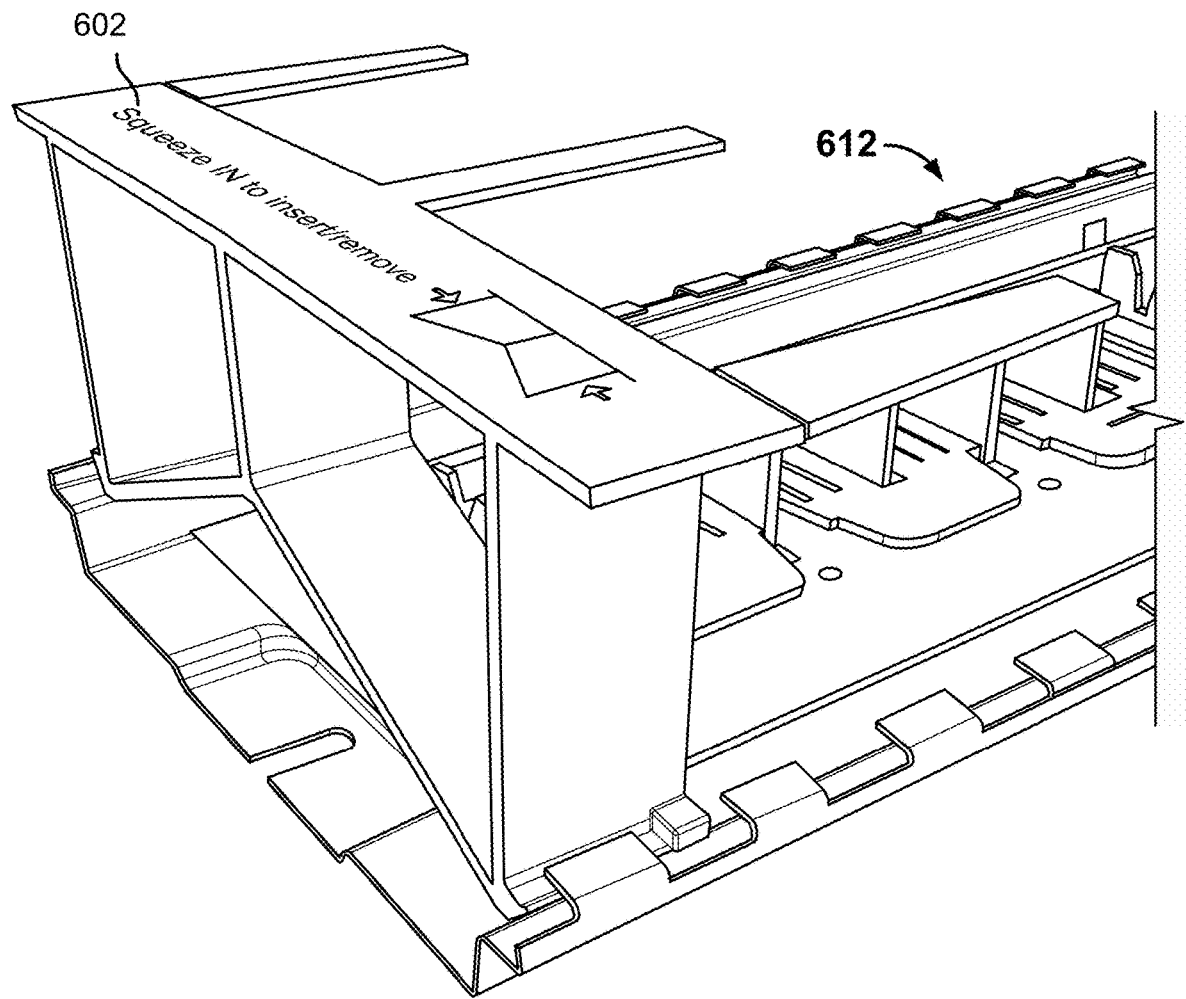
FIG. 6 is a diagram showing only a breaker retention bracket secured into the load tray in accordance with some embodiments.

FIG. 6 is a diagram showing only a breaker retention bracket secured into the load tray in accordance with some embodiments. FIG. 6 shows breaker retention bracket 602 locked/secured into load tray 612 but unlike FIGS. 5A and 5B, FIG. 6 does not show breakers being retained by breaker retention bracket 602. The view shown in FIG. 6 serves to illustrate how breaker retention bracket 602 appears while secured into the hooks of load tray 612 when the breaker(s) that are to be held down by breaker retention bracket 602 are themselves not shown.

Figure 7:
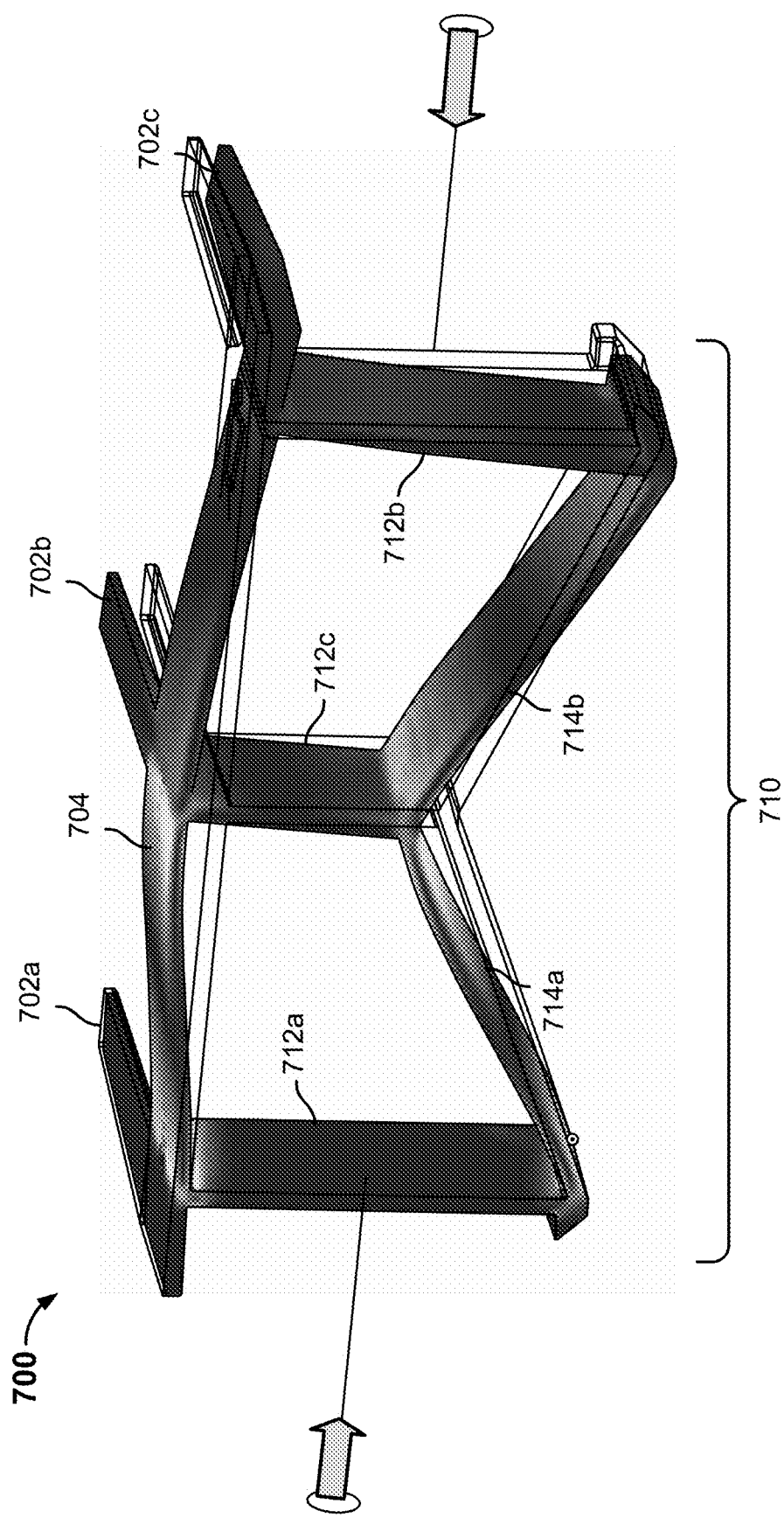
FIG. 7 is a diagram showing the flexing of components of a breaker retention bracket in response to being compressed.

FIG. 7 is a diagram showing the flexing of components of a breaker retention bracket in response to being compressed. In particular, FIG. 7 shows the outline of breaker retention bracket 700 at rest (e.g., not compressed or otherwise manipulated) and also a solid color version of breaker retention breaker 700 as it is being compressed. In response to legs 712a and 712b of flexible truss-structure 710 being squeezed towards leg 712c (e.g., during the installation or removal of breaker retention bracket 700 from a load tray), connectors 714a and 714b flex upwards (as indicated by the lighter color areas as shown in FIG. 7), especially where connectors 714a and 714b meet leg 712c. Also, while legs 712a and 712b of flexible truss-structure 710 are compressed, leg 712c is translated vertically to cause top surface 704 to flex/bow (as indicated by the lighter color areas as shown in FIG. 7) and also lift retention finger 702b upwards. As described above, the flexing of different portions of breaker retention bracket 700 facilitates its installation over or removal from one or more breakers in a load tray.

There are a number of advantages to the various embodiments of the breaker retention bracket that are described herein. In various embodiments, the breaker retention bracket can be manufactured as a single piece/part. Put another way, the breaker retention bracket is not an assembly of multiple components. Furthermore, the breaker retention bracket as described herein can be manually installed over and removed from covering breaker(s) without the use of any tools (e.g., a screw-driver). Moreover, the breaker retention bracket is made of flexible materials (e.g., partially fiber-filled plastic, metal, or a composite material) that enable an installer to easily deform (e.g., squeeze) the outer legs of its truss-structure to install or remove the breaker retention bracket into a load tray. Additionally, the width of the top surface of the breaker retention bracket covers the terminal connections of wires to prevent the installer from inadvertently disturbing the wire during the removal of the breaker retention bracket. What is more, the breaker retention bracket as described herein is compatible to install over various brands of breakers and breaker types (e.g., single-pole or double-pole).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A breaker retention bracket, comprising:
   a retention portion comprising one or more retention fingers that are configured to be positioned to overlap at least a portion of a breaker installed in a load tray;
   a footer portion that is configured to couple the breaker retention bracket to the load tray; and
   a flexible truss-structure, wherein compression of the flexible truss-structure is configured to cause flexing of a top surface of the breaker retention bracket to facilitate coupling or uncoupling of the breaker retention bracket to the load tray,
   wherein a length of the top surface of the breaker retention bracket is longer than a distance between a first leg and a second leg of the flexible truss-structure.

2. The breaker retention bracket of claim 1, wherein the one or more retention fingers extend across at least a width of a surface of the breaker.

3. The breaker retention bracket of claim 1, wherein the breaker comprises a back-fed breaker.

4. The breaker retention bracket of claim 1, wherein the first and the second legs are equal in length.

5. The breaker retention bracket of claim 4, wherein the flexible truss-structure further comprises a third leg, wherein the third leg is connected by a first connector to the first leg, wherein the third leg is connected by a second connector to the second leg, and wherein the third leg is shorter than either the first leg or the second leg.

6. The breaker retention bracket of claim 1, wherein the footer portion is configured to couple the breaker retention bracket to the load tray by engaging a breaker mounting feature of the load tray.

7. The breaker retention bracket of claim 6, wherein the footer portion further comprises a stopper that is configured to prevent the breaker retention bracket sliding out from the breaker mounting feature of the load tray.

8. The breaker retention bracket of claim 1, wherein the breaker retention bracket comprises a plastic material, a metal material, or a composite material.

9. The breaker retention bracket of claim 1, wherein the compression of the flexible truss-structure is further configured to cause an end of a retention finger from the one or more retention fingers to lift.

10. The breaker retention bracket of claim 1, wherein the breaker retention bracket is configured to retain adjacent breakers.

11. The breaker retention bracket of claim 1, wherein the breaker retention bracket is configured to retain a single-pole breaker, a double-pole breaker, or both.

12. The breaker retention bracket of claim 1, wherein the retention portion, the footer portion, and the flexible truss-structure are manufactured as a single piece.

13. The breaker retention bracket of claim 1, wherein at least one retention finger of the one or more retention fingers includes a respective breakaway line or score line along a connection to the top surface of the breaker retention bracket that is configured to facilitate a removal of the at least one retention finger.

14. The breaker retention bracket of claim 1, wherein the breaker retention bracket is configured to be installed without a tool.

15. A breaker retention bracket, comprising:
- a retention portion comprising one or more retention fingers that are configured to be positioned to overlap at least a portion of a breaker installed in a load tray;
- a footer portion that is configured to couple the breaker retention bracket to the load tray; and
- a flexible truss-structure, wherein compression of the flexible truss-structure is configured to cause flexing of a top surface of the breaker retention bracket to facilitate coupling or uncoupling of the breaker retention bracket to the load tray,
- wherein the flexible truss-structure comprises a first leg and a second leg, and wherein the first and the second legs are equal in length,
- wherein the flexible truss-structure further comprises a third leg, wherein the third leg is connected by a first connector to the first leg, wherein the third leg is connected by a second connector to the second leg, and wherein the third leg is shorter than either the first leg or the second leg.

16. The breaker retention bracket of claim 15, wherein the breaker retention bracket comprises a plastic material, a metal material, or a composite material.

17. The breaker retention bracket of claim 15, wherein the retention portion, the footer portion, and the flexible truss-structure are manufactured as a single piece.

18. The breaker retention bracket of claim 15, wherein the breaker retention bracket is configured to be installed without a tool.

19. A breaker retention bracket, comprising:
- a retention portion comprising one or more retention fingers that are configured to be positioned to overlap at least a portion of a breaker installed in a load tray, wherein at least one retention finger of the one or more retention fingers includes a respective breakaway line or score line along a connection to a top surface of the breaker retention bracket that is configured to facilitate a removal of the at least one retention finger;
- a footer portion that is configured to couple the breaker retention bracket to the load tray; and
- a flexible truss-structure, wherein compression of the flexible truss-structure is configured to cause flexing of the top surface of the breaker retention bracket to facilitate coupling or uncoupling of the breaker retention bracket to the load tray.

* * * * *